US005624126A

United States Patent [19]

Vosbikian et al.

[11] Patent Number: 5,624,126

[45] Date of Patent: Apr. 29, 1997

[54] MECHANIC'S CREEPER WITH DETACHABLE TOOL BOX

[75] Inventors: Jack Vosbikian; Mark S. Wellner, both of Cherry Hill, N.J.

[73] Assignee: International Rollforms Inc., Deptford, N.J.

[21] Appl. No.: 576,570

[22] Filed: Dec. 21, 1995

[51] Int. Cl.[6] .............................. B60R 9/055; B60R 11/06

[52] U.S. Cl. .............................. 280/32.6; 280/79.2

[58] Field of Search .............................. 280/32.5, 32.6, 280/79.2

[56] References Cited

U.S. PATENT DOCUMENTS

| | | | |
|---|---|---|---|
| D. 152,008 | 12/1948 | Lucas | 280/32.6 X |
| D. 270,962 | 10/1983 | Martell | 280/32.6 X |
| D. 330,957 | 11/1992 | Contrini | 280/32.6 X |
| D. 354,599 | 1/1995 | Young | 280/32.6 X |
| 1,184,487 | 5/1916 | Peterson | 280/32.6 |
| 1,348,683 | 8/1920 | Aldenbruck et al. | 280/32.5 |
| 4,489,837 | 12/1984 | Adair | 211/86 |
| 4,795,180 | 1/1989 | Polcyn | 280/79.1 |
| 4,986,558 | 1/1991 | Morris | 280/32.6 |
| 5,330,211 | 7/1994 | Nicholson | 280/32.6 |
| 5,494,305 | 2/1996 | Chen | 280/32.6 |
| 5,503,415 | 4/1996 | Powell | 280/32.6 |

*Primary Examiner*—Brian L. Johnson
*Attorney, Agent, or Firm*—Norman E. Lehrer

[57] ABSTRACT

A creeper includes a torso supporting platform with a front wall, a rear wall and two opposing side walls. A pair of spaced apart recesses are formed in one of the side walls. Extending downwardly from the platform are a plurality of casters. A tool box with a front wall, a rear wall and two opposing side walls has a pair of locking tabs extending outwardly from one of the side walls thereof. Each of the locking tabs is adapted to engage a corresponding one of the recesses formed in the side wall of the torso supporting platform.

5 Claims, 2 Drawing Sheets

MECHANIC'S CREEPER WITH DETACHABLE TOOL BOX

BACKGROUND OF THE INVENTION

The present invention relates to creepers for use by mechanics and, more particularly, to such a creeper having a tool box detachably mounted thereto.

Creepers are used by virtually every automobile mechanic in order to comfortably maneuver while lying on his back underneath an automobile. Typically, a creeper has a number of casters mounted to its lower surface in order to allow the mechanic to freely move and change position while underneath the car.

When a mechanic is working underneath an automobile, he typically places a tool box next to the creeper. Accordingly, if the mechanic moves to a different location under the car, he must move the tool box. This is rather inconvenient.

In recognition of the foregoing, devices have been disclosed which attempt to provide a mechanic working underneath an automobile with quick and easy access to his tools. For example, U.S. Pat. No. 5,330,211 to Nicholson disc loses a mechanic's creeper that is equipped with a drawer frame. The drawer frame is adapted to slidably receive a drawer full of tools. This construction, however, is relatively expensive to manufacture. Furthermore, the tool filled drawer is located beneath the creeper and is still somewhat inconvenient to reach.

U.S. Pat. No. 4,795,180 to Polcyn discloses a tool caddy that is used in conjunction with a mechanic's creeper. The tool caddy has a plurality of casters secured to the bottom thereof so that the mechanic can move the same as he maneuvers the creeper under the automobile. Since the tool caddy is independent of the creeper, the movement of the former is cumbersome as it requires the mechanic, who is lying in the prone position, to grasp the caddy with one hand as he maneuvers the creeper.

SUMMARY OF THE INVENTION

The present invention is designed to overcome the deficiencies of the prior art discussed above. It is an object of the invention to provide a mechanic's creeper having a tool box detachably mounted thereto.

It is a further object of the invention to provide such a creeper wherein the tool box can be firmly secured to the creeper body.

It is yet another object of the invention to provide such a creeper wherein the tool box is conveniently positioned on the creeper to provide the mechanic with quick and easy access to his tools.

In accordance with the illustrative embodiments and demonstrating features of the present invention there is provided a creeper which includes a torso supporting platform with a number of casters extending downwardly therefrom. The torso supporting platform has a front wall, a rear wall and a pair of opposing side walls. A recess is formed in one of the side walls of the torso supporting platform. Extending downwardly from the platform are a plurality of casters. A tool box is releasably secured in the recess formed in the side wall of the torso supporting by means of a locking tab which extends from a side wall of the tool box.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
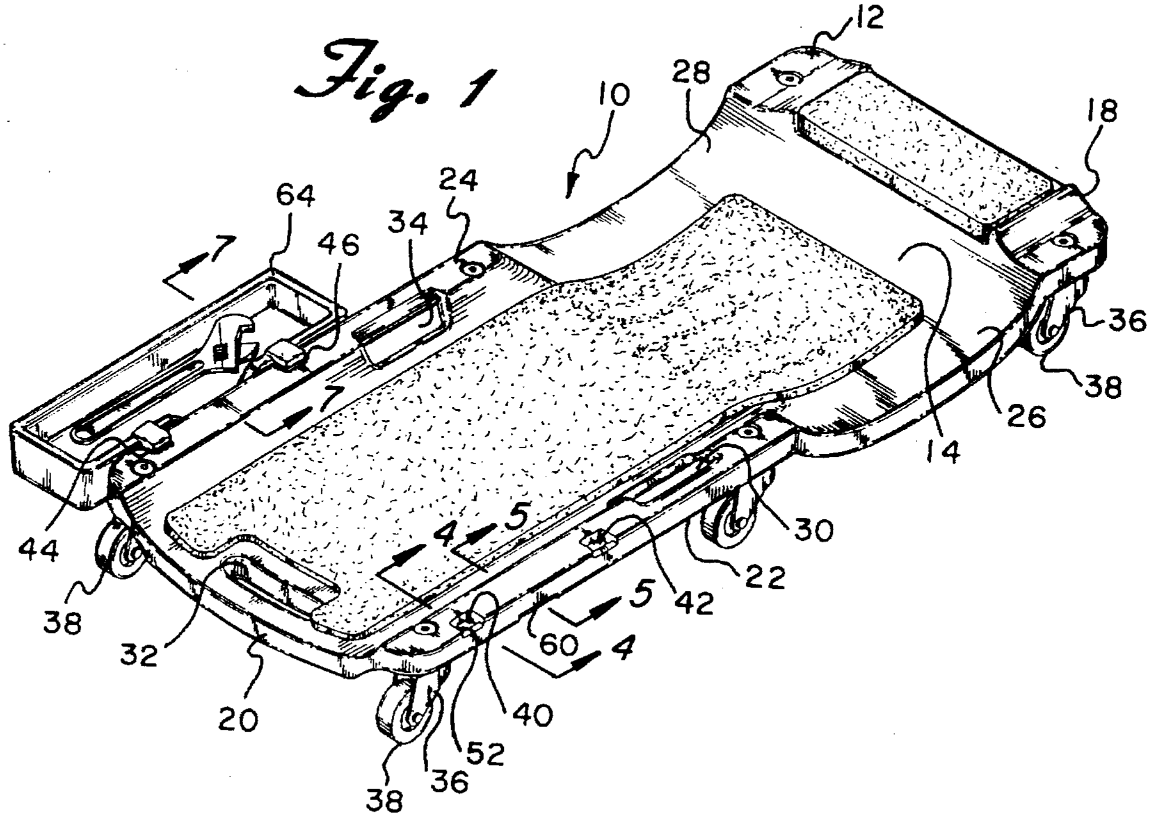
FIG. 1 is a perspective view of a mechanic's creeper constructed in accordance with the principles of the present invention and showing a tool box mounted thereto.

Referring now to the drawings in detail wherein like reference numerals have been used throughout the various figures to designate like elements, there is shown in FIG. 1 a mechanic's creeper constructed in accordance with the principles of the present invention and designated generally as 10.

The creeper 10 includes a torso supporting platform 12. The platform is preferably made of molded plastic. However, it can be made of other suitable material such as fiberglass. The platform 12 has a concave portion 14 to accommodate a mechanic's torso. The platform also includes front and rear walls 18 and 20, respectively, and side walls 22 and 24. The rear wall 20 is preferably lower than the front wall 18 so that a mechanic's legs can comfortably extend therefrom. Each of the side walls 22 and 24 has a depressed area 26 and 28, respectively, in order to comfortably accommodate the arms of a mechanic who is lying on his back with his torso in the concave portion 14 of the platform 12. A plurality of slotted openings 30, 32 and 34 are formed in the periphery of the platform 12 for accommodating a user's hand in order to facilitate the transportation of the creeper 10.

Extending downwardly from the periphery of platform 12 are a plurality of casters 36. The casters are of a type generally known in the art and each includes a wheel 38 rotatably mounted thereto for allowing the creeper 10 to be easily maneuvered on the ground.

Figure 4:
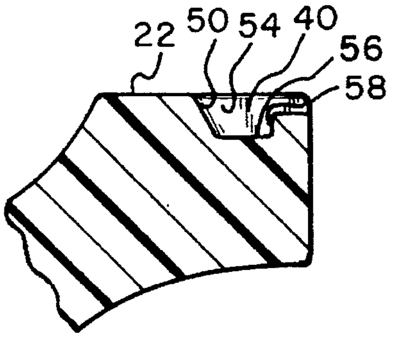
FIG. 4 is a partial cross-sectional view taken along lines 4—4 of FIG. 1.

Spaced apart recesses 40 and 42 are formed in the top of side wall 22. Similarly, spaced apart recesses 44 and 46 are formed in the top of side wall 24. Each recess is substantially identical to the other recesses. Accordingly, only one recess will be described in detail it being understood that the description applies equally to the other recesses. Recess 40 is defined by a rear wall 50, opposing side walls 52 and 54, a bottom 56, and a front wall 58 (see FIGS. 1 and 4).

Figure 5:
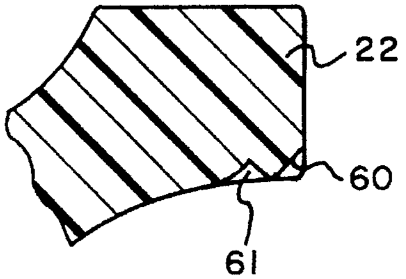
FIG. 5 is a partial cross-sectional view taken along lines 5—5 of FIG. 1.
Figure 6:
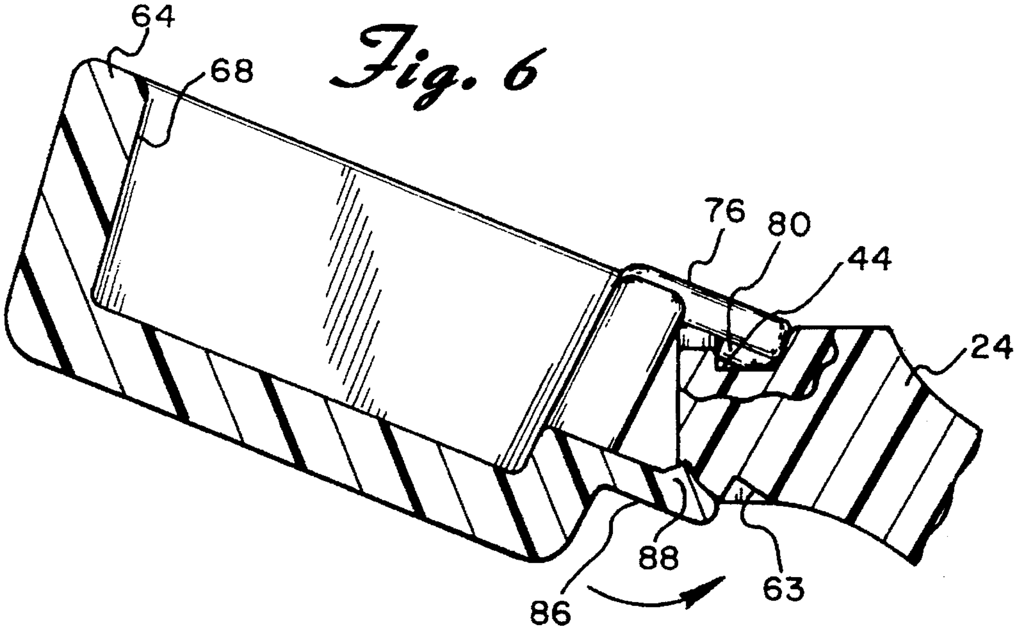
FIG. 6 is a cross-sectional view showing the tool box being mounted to the creeper.
Figure 7:
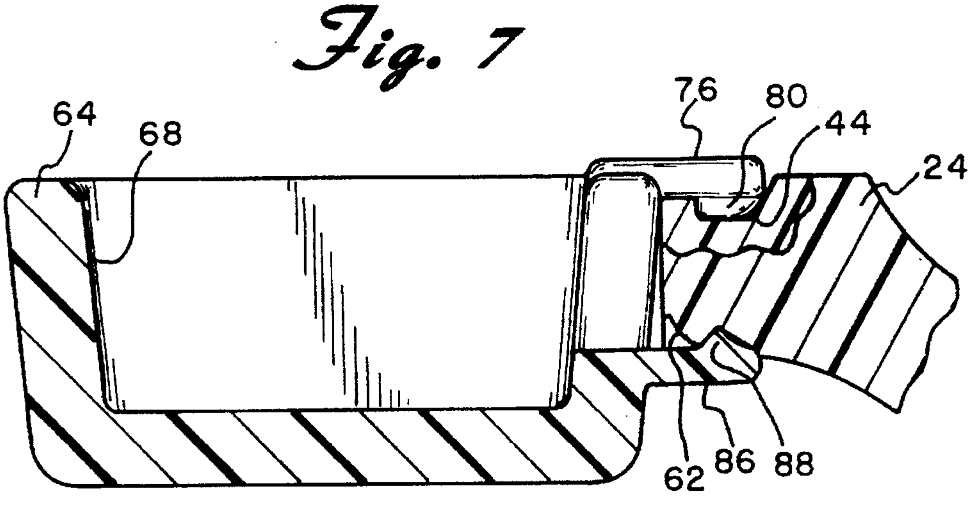
FIG. 7 is a cross-sectional view taken along lines 7—7 of FIG. 1 with the tool omitted for clarity.

In the preferred embodiment, a chamfered surface 60 is formed in the lower surface of the side wall 22 between spaced apart recesses 40 and 42 (see FIGS. 1 and 5). Similarly, a chamfered surface 62 is formed in the lower surface of the side wall 24 between spaced apart recesses 44 and 46 (see FIG. 7). Molded into the lower surface of the side walls adjacent each of the chamfered surfaces is a corresponding elongated notch 61 and 63, respectively (see FIGS. 5 and 6).

Figure 3:
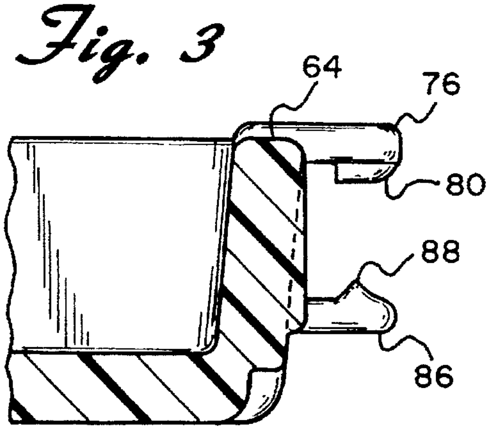
FIG. 3 is a partial cross-sectional view taken along lines 3—3 of FIG. 2.
Figure 2:
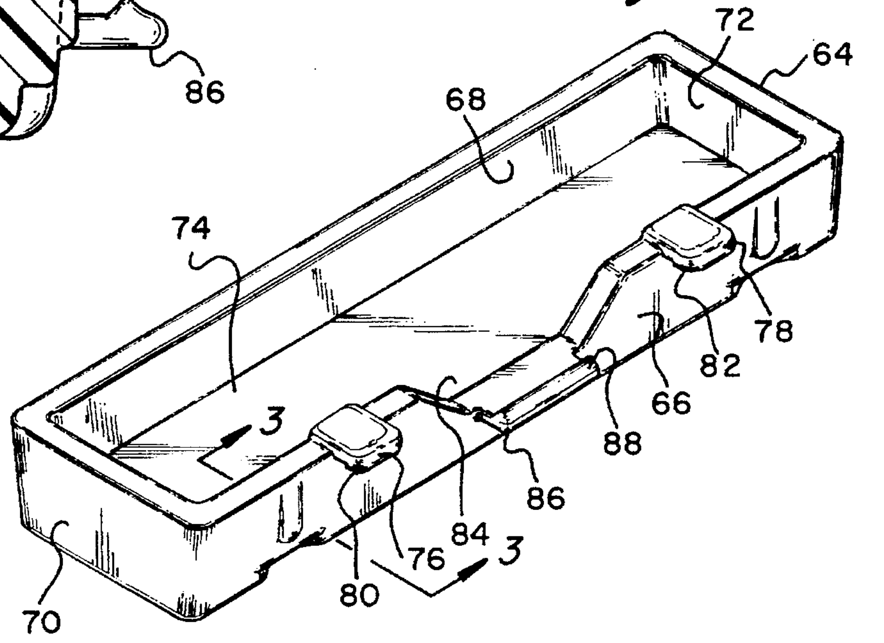
FIG. 2 is a perspective view of the tool box.

Referring to FIGS. 2 and 3, a tool box 64 is shown. The tool box includes side walls 66 and 68, a rear wall 70, a front wall 72 and a bottom 74. Extending outwardly from the top of the side wall 66 are locking tabs 76 and 78. Locking tab 76 includes a downwardly extending lip 80. Similarly, locking tab 78 includes a downwardly extending lip 82.

A recessed portion 84 is formed in the side wall 66 of the tool box between the two locking tabs 76 and 78. A flange 86 extends outwardly from the bottom of the recessed portion 84. The flange 86 includes an elongated locking portion 88 which extends upwardly therefrom along the length thereof.

In order to facilitate an understanding of the principles associated with the foregoing apparatus, its operation will now be briefly described. The tool box 64 is secured to the creeper 10 by first aligning the locking tabs 76 and 78 with the spaced apart recesses 44 and 46 in side wall 24. Lip 80 is then placed in recess 44 and lip 82 is simultaneously placed in recess 46 in the manner shown in FIG. 6. Thereafter, the tool box is rotated about the locking tabs by pushing wall 68 downwardly so that the lips 80 and 82 are positioned in their respective recesses and the upwardly extending elongated locking portion 88 of the flange 86 is moved along the chamfered surface 62. This causes flange 86 to flex slightly downwardly until the portion 88 passes the crest between the chamfered surface 62 and the elongated notch 63. At this point, the portion 88 snaps into the elongated notch 63 in the lower surface of the side wall 24 of the platform 12 (see FIGS. 6 and 7). With the tool box 64 secured in place, the mechanic has ready access to the tools he needs.

In order to remove the tool box 64 from the creeper 10, the side wall 68 of the tool box is rotated by lifting the same upwardly. This causes the upwardly extending elongated portion 88 of the flange to be disengaged from the elongated notch 63 as it rides up the distal wall of the notch. Eventually, the locking tabs 76 and 78 become disengaged from the recesses 44 and 46. It should be noted that the tool box can be secured to the side wall 22 instead of side wall 24 by securing the locking tabs in recesses 40 and 42 and by securing the flange 86 in the elongated notch 61.

The present invention may be embodied in other specific forms without departing from the spirit or essential attributes thereof and accordingly reference should be made to the appended claims rather than to the foregoing specification as indicating the scope of the invention.

What is claimed is:

1. A creeper comprising:

a torso supporting platform having a front wall, a rear wall and a pair of opposing side walls;

a pair of spaced apart recesses formed in one of said side walls;

a plurality of casters extending downwardly from said platform;

a tool box having a front wall, a rear wall and a pair of opposing side walls;

two spaced apart locking tabs, each of said locking tabs extending outwardly from one of said side walls of said tool box and being adapted to engage a corresponding one of said recesses in said side wall of said torso supporting platform;

a flange extending outwardly from said side wall of said tool box between said locking tabs and below a horizontal plane thereof, and means for securing said flange to said torso supporting platform.

2. The creeper of claim 1, wherein said means for securing said flange to said torso supporting platform includes said torso supporting platform having an elongated notch formed in the lower surface of said side wall between said recesses in said torso supporting platform and said flange of said tool box having an elongated portion extending upwardly therefrom and along the length thereof, said elongated portion being adapted to engage said elongated notch.

3. The creeper of claim 1 wherein each of said locking tabs includes a lip extending downwardly therefrom, each of said lips being adapted to firmly engage a corresponding one of said recesses formed in said side wall of said torso supporting platform.

4. The creeper of claim 1 further including a second pair of spaced apart recesses formed in the other one of said side walls of said torso supporting platform.

5. The creeper of claim 2 further including a second elongated notch formed in the lower surface of said other one of said side walls of said torso supporting platform between said second pair of recesses, said elongated portion of said tool box being adapted to engage said second elongated notch.

* * * * *